L. J. BREHL.
VEHICLE FENDER.
APPLICATION FILED APR. 22, 1914.

1,116,981.

Patented Nov. 10, 1914.
2 SHEETS—SHEET 1.

Witnesses
Hugh H. Ott
P. M. Smith

Inventor,
Leo J. Brehl
By Victor J. Evans
Attorney

L. J. BREHL.
VEHICLE FENDER.
APPLICATION FILED APR. 22, 1914.

1,116,981.

Patented Nov. 10, 1914.
2 SHEETS—SHEET 2.

Witnesses
Hugh H. Ott
R. M. Smith

Inventor
Leo J. Brehl
By Victor J. Evans
Attorney

UNITED STATES PATENT OFFICE.

LEO J. BREHL, OF LORAIN, OHIO.

VEHICLE-FENDER.

1,116,981.  Specification of Letters Patent.  Patented Nov. 10, 1914.

Application filed April 22, 1914. Serial No. 833,714.

*To all whom it may concern:*

Be it known that I, LEO J. BREHL, a citizen of the United States, residing at Lorain, in the county of Lorain and State of Ohio, have invented new and useful Improvements in Vehicle-Fenders, of which the following is a specification.

This invention relates to vehicle fenders, the object in view being to produce a fender especially designed for application to automobiles and similar motor propelled vehicles, the said fender being automatic in action in that it is normally folded so as to give ample road clearance and is tripped by contact with a person or object and thereupon instantly carried into its operative or catching position and locked in such position.

A further object of the invention is to combine with the body of such a fender, wheel guards which are carried by the fender body and which will be automatically projected or thrust across in front of the steering wheels of the machine as the body of the fender reaches its operative position.

With the above and other objects in view, the invention consists in the novel construction, combination and arrangement of parts, as will hereinafter be more fully described, illustrated and claimed.

Figure 1:
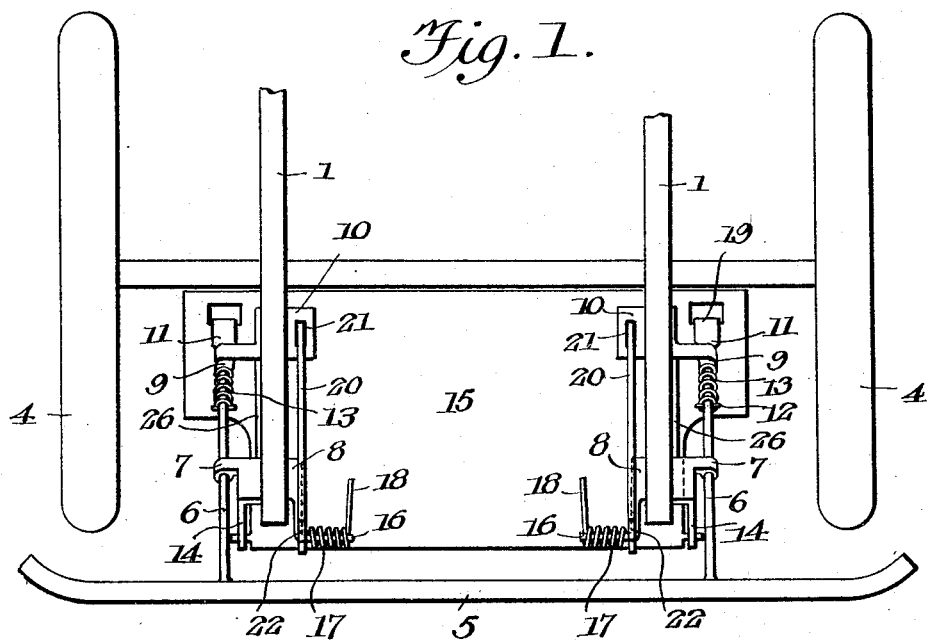
Figure 2:
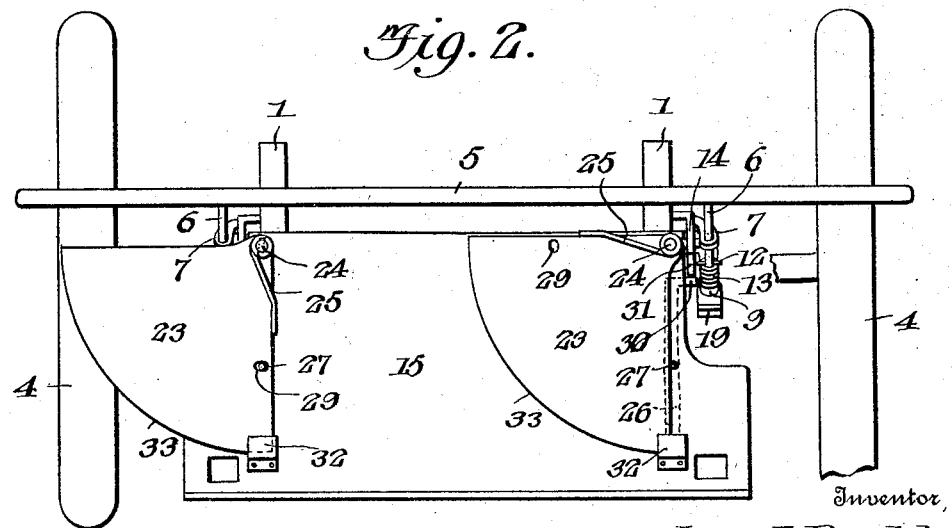
Figure 3:
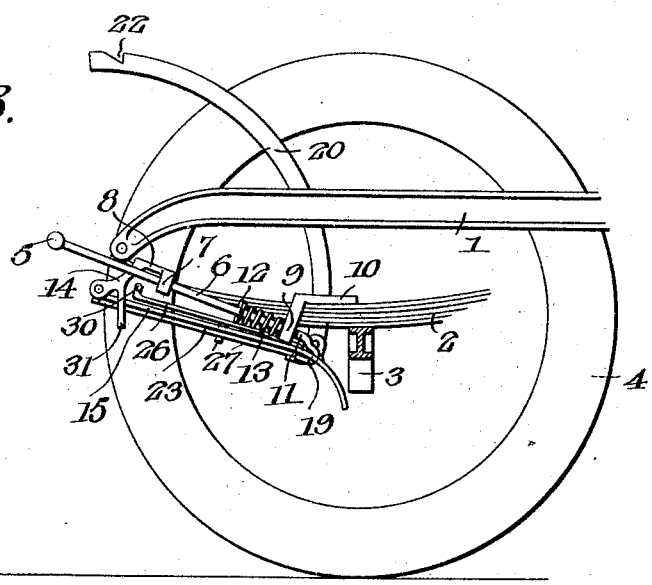
Figure 4:
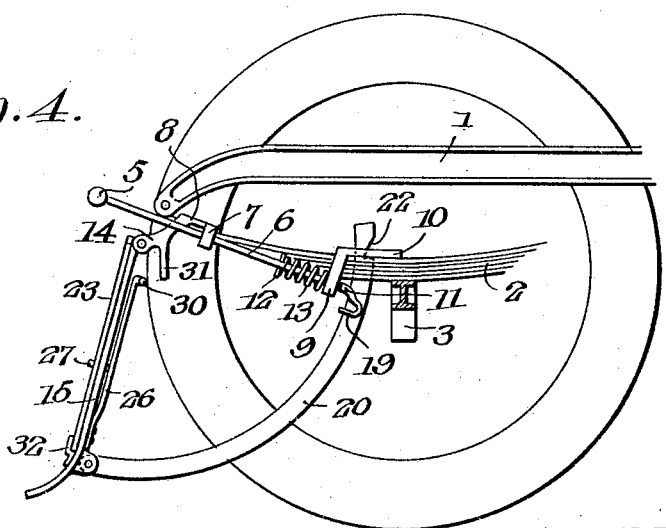

In the accompanying drawings:—Figure 1 is a plan view of the fender mechanism of this invention applied to an automobile, showing the fender raised. Fig. 2 is a front elevation of the same, showing the fender tripped. Fig. 3 is a side elevation thereof elevated. Fig. 4 is a similar view showing the fender down.

Referring to the drawings 1 designates the side bars of the frame or chassis of an automobile, 2 the front springs, 3 the front axle and 4 the front or steering wheels of the machine, all of said parts being of the usual present day construction and arrangement.

5 designates a pilot bar or bumper located at the extreme front of the machine and extending transversely across the same in advance of the front wheels 4 and the frame and springs 1 and 2 respectively. This bumper or bar 5 is carried by the forward ends of parallel rearwardly extending rods 6 which pass through eyes 7 in a pair of brackets 8 fastened to the forward extremities of the springs 2, said rods also passing through eyes 9 on a pair of guides 10 fastened to the springs 2 adjacent to the axle 3. Each of said rods is provided at its rear extremity with a stop shoulder 11 to limit the forward movement thereof and is also provided with a pin or shoulder 12 between which and the eye 9 is a coiled thrust spring 13 acting to hold the bumper bar 5 at the forward limit of its movement while permitting said bar to yield rearwardly for a purpose which will appear.

Each of the brackets 8 is provided with a hanger arm 14 and pivotally mounted on the hanger arms of the two brackets 8 is a fender body 15, said fender body being pivotally supported by the hanger arms 14, adjacent to its upper edge. Each of the brackets 8 is further provided with a spring holding arm 16 around which is a coiled torsion spring 17 one terminal of which indicated at 18 bears against the upper and rear side of the fender body 15 acting to quickly depress the fender body 15 when the latter is released from its folded position.

The fender body 15 is upheld in its folded or inoperative position by means of latches 19 carried by the rear extremities of the rods 6 and it will now be understood that when the bumper bar 5 is thrust rearwardly, the latches 19 are moved out of engagement with the rear edge of the fender body 15. The fender now being released is swung downward quickly by the action of the springs 17 and carried to its operative position illustrated by dotted lines in Fig. 3.

Extending rearwardly from the fender body 15 and attached thereto are curved braces 20 which are slidable through eyes 21 in the guides 10 above referred to. The braces 20 are notched to form shoulders 22 which engage the guides 10 when the fender reaches its operative position, thereby locking said fender in such position.

The fender body 15 carries a pair of oppositely movable wheel guards 23 each of said guards being pivotally mounted at 24 on the fender body 15, the said wheel guards 23 being actuated so as to project across in front of the wheels 4 by means of guard actuating springs 25. Connected to the rear side of the fender body 15 are locking springs 26 each of which carries a locking pin 27 adapted to engage the outer edge of the respective wheel guard 23 when the latter is in its inoperative position as illustrated in Fig. 2 and to engage a hole 29 in said wheel guard when the latter is thrown outwardly to its operative position in front of the adjacent wheel 4. At its upper end each of the locking springs 27 is provided with a finger 30 which as the fender body swings downwardly comes into contact with a trip arm 31 extending downwardly from the adjacent bracket 8.

32 designates a pair of guides or keepers on the forward side of the fender body 15 behind which the curved edges 33 of the wheel guards slide when moved outwardly and inwardly, the said keepers serving to prevent the wheel guards from swinging backwardly against the wheels 4 when they strike a person or object.

From the foregoing description taken in connection with the accompanying drawings it will now be understood that the fender body is normally carried in the folded or inoperative position illustrated in full lines in Figs. 1 and 3, said fender occupying a position under the forward portions of the front springs 2 and thereby giving ample road clearance. When the forward pilot bar or bumper 5 strikes a person or object, the latches 19 release the fender body and the latter is quickly thrown to its operative position by the action of the springs 17 and when it reaches the last named position it is locked by the engagement between the braces 20 and the guides 10. Just as the fender body reaches its operative position, the fingers 30 of the locking springs are acted upon by the trip arms 31 thereby withdrawing the locking pins 27 and permitting the wheel guards 23 to be thrust laterally outward by the action of the springs 25. When the wheel guards 23 reach their operative position they are locked by the pins 27 which are again thrust forwardly by the locking springs 26. The fender body including the wheel guards 23 thus form a protecting shield which extends entirely across the front of the machine including the front wheels. This prevents an object or person from passing under the wheels and under the running gear of the machine, said person or object either being picked up by the fender or pushed away from the wheels, frame and running gear of the machine.

To restore the fender as a whole to its folded or inoperative position, the wheel guards 23 are unlocked by pressing backwardly on the locking springs 26, the guards being then swung to their inner limit of movement and being again locked by the pins 27. The braces 20 are then disengaged from the guides 27 and the fender body is swung rearwardly and upwardly to the position illustrated in full lines in Fig. 3, the bumper or pilot bar 5 being pushed rearwardly until the latches 19 are again engaged with the free edge of the fender body. The fender will remain in this position until the bumper or pilot bar 5 is again struck by a person or object.

What I claim is:—

1. A vehicle fender comprising a fender body mounted to swing on a horizontal axis extending across the front of the vehicle, a resiliently sustained bumper located in advance of said fender body, a fender body upholding latch actuated by the rearward thrust of said bumper to release said fender body, means for throwing said fender body downwardly to its operative position when released by said latch, wheel guards having a pivotal connection with said fender body and adapted to swing in a plane parallel to the main body of the fender, and means acting on said guards to project them in front of the vehicle wheels when the fender body reaches its operative position.

2. A vehicle fender comprising a fender body mounted to swing on a horizontal axis extending across the front of the vehicle, a resiliently sustained bumper located in advance of said fender body, a fender body upholding latch actuated by the rearward thrust of said bumper to release said fender body, means for throwing said fender body downwardly to its operative position when released by said latch, wheel guards having a jointed connection with said fender body and adapted to swing in a plane parallel to the main body of the fender, means acting on said guards to project them in front of the vehicle wheels when the fender body reaches its operative position, and means on the fender body for locking said wheel guards.

3. A vehicle fender comprising a fender body mounted to swing on a horizontal axis extending across the front of the vehicle, a resiliently sustained bumper located in advance of said fender body, a fender body upholding latch actuated by the rearward thrust of said bumper to release said fender body, means for throwing said fender body downwardly to its operative position when released by said latch, wheel guards having a jointed connection with said fender body and adapted to swing in a plane parallel to the main body of the fender, means acting on said guards to project them in front of the vehicle wheels when the fender body reaches its operative position, means on the fender body for locking said wheel guards, and means for automatically tripping said locking means as the fender body swings downwardly.

In testimony whereof I affix my signature in presence of two witnesses.

LEO J. BREHL.

Witnesses:
C. M. KREBS,
M. G. KREBS.

Copies of this patent may be obtained for five cents each, by addressing the "Commissioner of Patents, Washington, D. C."